(12) United States Patent
Dolmatov

(10) Patent No.: US 7,867,467 B2
(45) Date of Patent: *Jan. 11, 2011

(54) NANODIAMOND AND A METHOD FOR THE PRODUCTION THEREOF

(75) Inventor: Valery Yurievich Dolmatov, ul. Glinki, 1-59, Pushkin, St. Petersburg (RU) 196601

(73) Assignees: Federal State Institution "Federal Agency for Legal Protection of Military, Special and Dual Use Intellectual Activity Results" Under Ministry of Justics of the Russian Federation, Moscow (RU); Joint-Stock Company "Diamond Centre", St. Petersburg (RU); Valery Yurievich Dolmatov, St. Petersburg (RU)

( * ) Notice: Subject to any disclaimer, the term of this patent is extended or adjusted under 35 U.S.C. 154(b) by 0 days.

This patent is subject to a terminal disclaimer.

(21) Appl. No.: 12/087,280

(22) PCT Filed: Dec. 30, 2005

(86) PCT No.: PCT/RU2005/000686

§ 371 (c)(1),
(2), (4) Date: Jun. 30, 2008

(87) PCT Pub. No.: WO2007/078210

PCT Pub. Date: Jul. 12, 2007

(65) Prior Publication Data

US 2009/0004092 A1     Jan. 1, 2009

(51) Int. Cl.
*B01J 3/06* (2006.01)
*B22F 3/08* (2006.01)
(52) U.S. Cl. ................................... 423/446; 264/84

(58) Field of Classification Search ............ None
See application file for complete search history.

(56) References Cited

U.S. PATENT DOCUMENTS

| 4,483,836 A | * | 11/1984 | Adadurov et al. | ............ | 423/290 |
| 5,482,695 A | * | 1/1996 | Guschin et al. | ............. | 423/446 |
| 5,861,349 A | * | 1/1999 | Vereschagin et al. | .......... | 501/86 |
| 5,916,955 A | * | 6/1999 | Vereschagin et al. | ........ | 524/495 |

FOREIGN PATENT DOCUMENTS

WO    WO03086970    * 10/2003

OTHER PUBLICATIONS

Derwent Abstract of WO03086970; Derwent Account No. 2003-833687.*

* cited by examiner

*Primary Examiner*—Melvin C Mayes
*Assistant Examiner*—Guinever S Gregorio
(74) *Attorney, Agent, or Firm*—James Creighton Wray; Meera P. Narasimban

(57) ABSTRACT

The invention relates to carbon chemistry and is embodied in the form of a nanodiamond comprising 90.0-98.0 mass % carbon, 0.1-5.0 mass % hydrogen, 1.5-3.0 mass % nitrogen and 0.1-4.5 mass % oxygen, wherein the carbon is contained in the form a diamond cubic modification and in a roentgen-amorphous phase at a ratio of (82-95):(18-5) in terms of a carbon mass, respectively. The inventive method for producing said material consisting in detonating in a closed space of a carbon-inert gas medium a carbon-containing oxygen-deficient explosive material which is placed in a condensed phase envelop containing a reducing agent at a quantitative ratio between said reducing agent mass in the condensed envelop and the mass of the used carbon-containing explosive material equal to or greater than 0.01:1 and in chemically purifying by treating detonation products with a 2-40% aqua nitric acid jointly with a compressed air oxygen at a temperature ranging from 200 to 280° C. and a pressure of 5-15 MPa.

4 Claims, No Drawings

NANODIAMOND AND A METHOD FOR THE PRODUCTION THEREOF

This application claims the benefit of PCT/RU2005/000686 filed Dec. 30, 2005, which is hereby incorporated by reference in its entirety.

FIELD OF THE INVENTION

The given invention refers to the field of inorganic chemistry of carbon, to be exact, to diamond modification of carbon-Nanodiamond, possessing qualities of ultrahard material and method of its production, in particular, a method using detonation synthesis from carbon-containing explosive mixed with further Nanodiamond extraction using chemical methods.

PRIOR ART

Various composition materials produced by methods of detonation synthesis from carbon-containing explosives and containing carbon in various phases are known. Nanodiamond is formed at detonation of carbon-containing explosives with negative oxygen balance in special conditions in environment allowing to preserve it. Nanodiamond is an individual particle from 2 to 20 nm in size, utilized, as a rule, in bigger particles ensembles. Due to its nanosize Nanodiamond possesses high dispersion level, defects of surface structures particles, and consequently, active surface. These characteristics may vary in quite wide ranges depending on Nanodiamond production conditions.

Experts in the field of carbon chemistry are well aware for almost 20 years about Nanodiamond of classical elemental composition, mainly containing carbon in cubic diamond phase with the following elements structure, mass. %: carbon—72-90; hydrogen—0.6-1.5; nitrogen—1.0-4.5 and oxygen—4-25; and methods of its production (Volkov K. V., Danilenko V. V., Elin V. I. Diamond synthesis form carbon VV detonation products, Burn and explosion Physics, 1990, t. 26, No 3, p. 123-125; Lyamkin A. L, Petrov E. A., Ershov A. P. and others. Diamond acquisition from explosive materials, DAN USSR, 1988, t. 302; p. 611-613; Greiner N. R., Phillips D. S., Johnson F. J. D. Diamonds in detonation soot, Nature, 1988, vol. 333, p. 440-442; Petrov V. A., Sakovich G. V., Brylyakov P. M. Diamonds keeping conditions at detonation, DAN USSR, 1990, t. 313, No 4, p. 862-864; V. Y. Dolmatov. Superdispersed diamonds of detonation synthesis: characteristics and use, Chemistry progress, 2001 t. 70 (7), p. 687-708; V. Y. Dolmatov. Superdispersed diamonds of detonation synthesis, St. Petersburg, SPbGPU, 2003, 344 p).

The properties of classic Nanodiamond are fully described. (V. Y. Dolmatov. Superdispersed diamonds of detonation synthesis: characteristics and use, Chemistry progress, 2001 t. 70 (7), p. 687-708; V. Y. Dolmatov. Superdispersed diamonds of detonation synthesis, St. Petersburg, SPbGPU, 2003, 344 p; EP, 1288162, A2,).

Carbon chemistry experts are aware of the condensed carbon (CC)—composition carbon material, containing carbon in various modifications and, depending on conditions of detonation of carbon-containing explosives containing or not containing carbon in cubic diamond phase. Such CC can be produced by detonation of carbon-containing explosives with negative oxygen balance in special environment under conditions allowing to preserve condensed carbon products of explosion. (Lyamkin A. I., Petrov E. A., Ershov A. P. and others. Diamond acquisition from explosive materials, DAN USSR, 1988, t. 302, p. 611-613; Greiner N. R., Phillips D. S., Johnson F. J. D. Diamonds in detonation soot, Nature, 1988, vol. 333, p. 440-442; Petrov V. A., Sakovich G. V., Brylyakov P. M. Diamonds keeping conditions at detonation, DAN USSR, 1990, 1.313, No 4, p. 862-864; V. Y. Dolmatov. Superdispersed diamonds of detonation synthesis, St. Petersburg, SPbGPU, 2003, 344 p V. Y. Dolmatov. Superdispersed diamonds of detonation synthesis, St. Petersburg, SPbGPU, 2003, 344 P).

It is known that CC production method may include blast of carbon-containing charge in various environments, for example:

in gas environment, inert to carbon, for example in nitrogen environment, carbonic acid, light-end products of previous blast. (U.S. Pat. No. 5,916,955, CI);

in water foam (Petrov V. A., Sakovich G. V., Brylyakov P. M. Diamonds keeping conditions at detonation, DAN USSR, 1990, t. 313, No 4, p. 862-964);

charge water irrigation (RU, 2036835, CI);

in water cover (U.S. Pat. No. 5,353,708, CI);

in ice (RU, 2230702, CI).

Out of all existing methods of carbon-containing explosive materials detonation, the most effective from the view point of CC and diamond modification output is charge blast in water or ice cover (V. Y. Dolmatov. Superdispersed diamonds of detonation synthesis, St. Petersburg, SPbGPU, 2003, 344 p; RU, 2230702, C).

The CC received is a nano-dispersed carbon-containing powder, possessing specific characteristics and structure. For example, CC is distinguished by high dispersion ability, wide specific surface, presence of newly created carbonic faulted structures, increased reactivity.

There is synthetic diamond-carbon-base material (U.S. Pat. No. 5,861,349, A), consisting of grouped round and irregular shaped particles in diameters diapason not exceeding 0.1 M, where: a) element composition of mass. %: carbon from 75.0 to 90.0; hydrogen from 0.8 to 1.5; nitrogen from 0.8 to 4.5; oxygen—up to balance; b) phase composition, mass. %; amorphous carbon from 10 to 30, cubic modification diamond—up to balance; c) material porous structure, the volume of pores 0.6-1.0 $sm^3/gr$; d) material surface with existence of over 10-20% of surface of throwing, nitrite, primary and secondary hydroxyl groups, possessing various chemical shifts in the field of NMR spectrum and one or more oxy carboxylic functional groups, selected from the group of consisting of carbonylic groups, carboxylic groups, guanine groups, hydroperoxide and lactones groups over 1-2% of material surface related to carbon atoms by noncompensated connections; and e) specific surface from 200 to 450 $gM^2/g$.

Above mentioned material is produced by detonation synthesis method in the closed volume of explosive charge, which mainly contains carbon-containing explosive material or mix of such material, possessing negative oxygen balance. The charge detonation is initiated in presence of carbon particles with concentration from 0.01 to 0.015 $kg/m^3$ in environment, consisting of oxygen from 0.1 to 6% in volume and gas, inert towards carbon, at temperature of from 303 to 363 K. (U.S. Pat. No. 5,861,349, A). This method is carried out in pressure chamber with charge of negative oxygen balance, consisting mainly of, at least, one carbon-containing solid explosive.

10-20% of material surface are occupied by metal- nitrite-, primary and secondary hydroxyl groups and also oxycarboxyl and functional groups of general formula O.dbd.R, where R— is .dbd.COH, .dbd.COOH, .dbd.C.position 6H.position.4 or other combinations, besides 1-2% of material surface is occupied by carbon atoms with noncompensated connections.

Parameter–lattice distance–is $a_0=0.3562\pm0.0004$ nm, content of nonflammable impurities is from 0.1 to 0.5 mass. %.

The x-ray amorphous phase of the received material does not contain graphite.

Oxygen-containing functional groups, as a rule, are derivatives of various surface carbon structures, including aliphatic, alicyclic and aromatic. Both lacton.dbd.COOCC⁻, quinine.O.dbd.C pol. 6H.pol.4H.dbd.O, and hydroperoxide.dbd..COOOH groups were identified on surface of the produced material. Total quantity of oxygen-containing surface groups takes from 10 to 20% of sample surface.

However, the above mentioned method of diamond-carbon material production has low output of diamond-carbon material—3.1-5.1 mass. % and does not allow to receive material with high efficacy and of high quality, as due to low content of carbon—the most important element in diamond-carbon material—the end product contains large quantity of heteroatom, mainly oxygen, existing in form of lactone, etheric and aldehyde groups that leads to excessive chemical activity of diamond-carbon material. This fact increases possibility of destructive processes in compositions with use of diamond-carbon material, e.g. in polymerous and oil compositions, especially at elevated operating temperature.

Low (from 9.1 to 58.4 mass. %) content in produced condensed carbon of the main component of Nanodiamond—cubic modification diamond—makes the following chemical refinement of Nanodiamond complicated. Moreover, Nanodiamond properties are worsening due to considerable, ~2.3 mass. %, quantity of nonflammable impurities in chemically refined Nanodiamond. The above mentioned patent (U.S. Pat. No. 5,861,349, A) shows only one method of material production using one composition of explosive—mix of trotyl and cyclonite with 60/40 ratio respectively. This does not allow to evaluate all advantages of above mentioned method of diamond-carbon materials production. There is Nanodiamonds, produced by detonation synthesis, refinement method, with following impurities refinement (RU, 2109683, A) using two-stage treatment of detonation products by water solution of nitric acid: first 50-99%-nitric acid at 80-180° C., then 10-40%-nitric acid at 220-280° C. Liquid phase behavior of the process is provided by pressure. However this method is not used widely due to high aggression and corrosion activity of used concentrated nitric acid, its large consumption, complicacy of utilization and neutralization of gauzy and liquid wastes. The closest analogue for this Nanodiamond refinement method is one described in literature (Gubarevich T. M., Dolmatov V. Y. Chemical refinement of diamonds by hydrogen peroxide. Applied Chemistry magazine. 1992, t. 65, No 11, p. 2512-2516). The method consists of treatment of detonation products, containing nanodiamonds, by oxidizing solution, including hydrogen peroxide, nitric acid or variable valency metal salt. This method disadvantage is in use of expensive and rare oxidizer—hydrogen peroxide, danger of operating with such easily decomposing combination, constantly emitting very active oxidizer—atomic oxygen.

SUMMARY OF THE INVENTION

The objective of the given invention is developing Nanodiamond production method-safe, reliable, characterized by improved technical, economical and ecological parameters and allowing to organize wide production of nanodiamonds, possessing predictable qualities and predictable elemental composition with high carbon content in desired phase conditions.

During invention development the objective was set to develop the method of producing nanodiamond, possessing high concentration of carbon of desired modifications and desired phase composition from carbon-base material using detonation synthesis under conditions preventing oxidation of nanodiamond surface and providing safety of the acquired diamond phase.

The objective was achieved through production of diamond-carbon material, containing carbon, hydrogen, nitrogen and oxygen. Its distinction is that material contains carbon in form of diamond cubic modification and in x-ray amorphous phase with ratio (82-95):(18-5) according to carbon mass, respectively, and contains, mass. %:

Carbon 90.2-98.0
Hydrogen 0.1-5.0
Nitrogen 1.5-3.0
Oxygen 0.1-4.5

The objective was achieved through development of method of production of nanodiamond, containing detonation of carbon-containing explosive with negative oxygen balance in closed volume in gauzy environment inert towards carbon, in condensed phase surrounding, distinguished by carrying out detonation of carbon-containing material explosive put into condensed phase cover, containing deoxidizer at quantitative ratio of deoxidizer mass in condensed phase to mass of the used carbon-containing explosive not less than 0.01:1. Chemical refinement is applied by treating detonation products by 2-40% water nitric acid alone with compressed air oxygen at temperature of 200-280° C. and pressure 5-15 MPa, and produce Nanodiamond, containing mass. % :

Carbon 90.2-98.0
Hydrogen 0.1-5.0
Nitrogen 1.5-3.0
Oxygen 0.1-4.5 containing diamond cubic modification carbon and x-ray amorphous phase carbon in ratio (82-95): (18-5) mass. %, respectively. It is reasonable, according to invention, to use as deoxidizer organic or inorganic compounds, preferably those not containing oxygen and halogen atoms.

Further, the given invention is explained with help of examples of its realization, however, not limiting possibilities of the method realization and not stepping out the patent claims.

DETAILED DESCRIPTION OF PREFERRED EMBODIMENTS

The process of nanodiamond formation by method according to invention, including detonation of carbon-containing explosive with negative oxygen balance, surrounded by condensed phase containing deoxidizer can be divided into four stages.

1. Stage one. Detonation transformation of carbon containing explosive at blast mainly happens in range of charge volume, limited by its outer surfaces, but charge surrounding environment does not influence the process of transformation.

According to research results, explosive materials with negative oxygen balance leads to creation of "extra" carbon, which remains in condensed form. Part of this "extra" carbon transfers into cubic modification diamond after explosion.

Charge placement into environment of liquid or solid aggregate condition, e.g. when blown up in the pool filled with water or ice that prevents detonation products throwout, creates conditions for increased length of existence of high pressure and temperature complex created at detonation, which is existence environment for diamond and liquid carbon.

Charge placement inside the condensed phase, both liquid or solid aggregate condition, containing cover, e.g. in form of ice or water, also allows to keep the detonation products for longer time in the volume of primary charge, which leads to prolonged existence of plasma, containing detonation products, and contributes to better transformation of "extra" carbon into diamond phase.

2. Stage two. This transformation stage starts after the detonation process completes. It is very important to provide fast gas-dynamic cooling of detonation products for preservation of cubic modification diamonds, created in chemistry transformation zone. It is known that due to explosion in vacuum, the fastest gas-dynamic cooling of detonation products takes place due to high speed of throwout. However, kinetic energy of detonation products transforms into heat energy as they blow the walls of the explosive chamber. Chamber temperature goes up fast achieving very high values and after calming down of all blows inside the chamber the temperature sets up for ~3500 K—close to detonation temperature. The cubic modification diamonds fully transform into graphite, as chamber pressure drops times faster then chamber temperature. After that all CC gasify due to prolonged influence of high temperatures that is why cubic modification diamonds do not preserver in vacuum explosion. The slowest gas-dynamic cooling exists at detonation products throwout surrounded by massive ice or water covers. So maximum set temperature of detonation products does not exceed 500-800K due to effective energy extraction by water (RU, 2230702, C; V. A. Mazanov. Macrokinetics of condensed carbon and detonation nanodiamond preservation in hermetic explosive chamber, solid body physics, 2004, t. 46, iss. 4, p. 614-620).

The gas-dynamic cooling intensity of explosion in inert gas environment takes middle value between vacuum explosion and condensed phase, in form of water or ice, cover explosion, as speed of detonation products throwout in gas environment is lower than in vacuum but higher than in water and ice cover. As CC existence is determined mainly by residual temperature in explosive chamber—the lower the temperature, the higher the diamond-carbon material output—then the use of condensed covers around the charge seems to be the best since they create the highest cooling rate.

3. Stage three of detonation synthesis of diamond-carbon material comes after shock waves reflection from the chamber walls: circulation of shock waves, spreading with supersonic speed and accompanied by processes of sharp increase of substance density, pressure and temperature, and turbulent mixing of detonation products with environment inside the chamber takes place. The maximum set temperature of environment inside the chamber depends on ration of explosive mass and gas components, i.e. chemical environment activity and gases heat capacity.

4. Stage four. The environment, heat by explosion of carbon-containing explosive and limited by cool cover—is cooling intensively. After explosion and detonation products release, chamber contains various kinds of gauzy products ($CO_2$, CO, $O_2$, $H_2$, $N_2$, $CH_4$, NO, $NO_2$, $NH_3$, $H_2O$), and highly dispersed suspension of CC particles possessing high radiate capability. Thus the process of such environmental cooling is characterized by combined heat transfer through convection and emission.

Using the method of electroconductivity profile measurement in detonation wave they determined that time of cubic diamond modification formation does not exceed 0.2-0.5 mcs, which corresponds to the width of chemical reaction zone in mix compositions of trinitrotoluene-cyclonite explosions, both pressed and lithium (Staver A. M., Ershov A. P., Lyamkin A. I. Research on detonation transformation of condensed explosives by electroconductivity method. Physics of burn and explosion, 1984 t. 20, Ks3, p. 79-82).

As part of substance formed in the first stage of detonation solid CC particles transforms into gases under the influence of gauzy oxidizers formed by explosion: $CO_2$, $H_2O$, CO, $O_2$, $N_2O_3$, $NO_2$, we can talk about preserved particles CC that didn't succeed to gasify, including due to lack of above mentioned oxidizers.

Any non responded solid particles of CC carbon have functional groups cover. Thus interaction of surface functional groups with gauzy oxidizers is capable to change primary functional groups, including non oxygen containing for oxygen containing, as all oxidizers contain oxygen. The use of important deoxidizer function—tie oxidizer, preventing carbon oxidation, creates conditions for preventing carbon particles surfaces from oxidation. Thus, creating conditions for considerable increase of carbon content in nanodiamond. This increase is being achieved through decrease in oxygen content, as following research results, content of nitrogen and hydrogen changes insufficiently. We should also note the fact that high content of oxygen in nanodiamonds prevents it from efficient use in some technologies. For example, when using diamond-carbon material as additives to oil, availability of large quantity of oxygen increases oxidizing capability of material.

Maximum output of CC—12%—is achieved by explosion of carbon-containing material in gas chamber under conditions of set temperature of 1500±150K. Increasing the temperature in chamber till 3000-3500K we will decrease the output till zero. (V. A. Mazanov. Macrokinetics of condensed carbon and detonation nanodiamond preservation in hermetic explosive chamber, solid body physics, 2004, t. 46, iss. 4, p. 614-620).

Preservation possibility of received diamonds of cubic modification and elemental composition of diamond-carbon material depends on intensity of hetero phase endothermic reactions of CC gasification by carbon dioxide (1) and water steam (2) behavior in gas chamber that can be presented as single gross-reaction (3):

$C+CO_2>2CO-172.4$ kJ/mole (1)

$C+H_2O>CO+H_2-130.1$ kJ/mole (2)

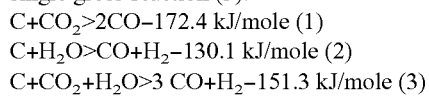
$C+CO_2+H_2O>3\ CO+H_2-151.3$ kJ/mole (3)

Two competing processes occur in explosive chamber under high temperature:

CC gasification—non-diamond carbon in the first turn as more active, and graphitization of formed diamonds of cubic modification.

Thus authors found it reasonable to develop conditions of synthesis carrying out that would provide minimal influence possibilities of detonation products onto received, at detonation, product and maximum possible speed of product cooling to prevent its gasification. Following invention, the input of deoxidizer into condensed cover of the charge allows achieving several effects:

1. Deoxidizer prevents carbon particles surface from oxidation in the third stage of detonation process, by tying oxidizers as the most active chemical components inside the chamber. As a result, content of the main heteroatom-oxygen, preventing farther use of CC, sharply drops till 0.1%, and its place is taken by quite inert and neutral hydrogen. Carbon content increases to 95.2%.

2. The chamber temperature drops sharply due to partial decomposition of oxidizer under high temperatures, which in turn, decreases gasification process (reactions 1-3) and "freezes" phase transformation diamond-graphite.

Thus deoxidizer input allows increasing nanodiamonds output by 1.7-2.6 times in comparison to nanodiamonds output 3.1-5.1% using known technology (U.S. Pat. No. 5,681,459, A).

Any organic or inorganic compositions possessing deoxidizer qualities, mainly those not oxygen- and halogen-containing and showing expressed deoxidizer qualities, can be used as deoxidizer. Intermediate product, produced as a result of detonation synthesis is highly dispersed condensed carbon (CC), containing not only nanodiamonds, but also non-diamond carbon in high reactivity form, is undergoing chemical treatment according to invention. Nitric acid is quite powerful oxidizer for non-diamond carbon. The interval used for nitric acid concentration refinement 2-40 mass. % was determined experimentally, according to technologically acceptable speeds of reaction. Lowering concentration below 2% leads to productivity decrease. Increasing nitric acid concentration over 40% is unreasonable due to increased number of acid waste and increasing corrosion activity of environment.

In case we treat CC by nitric acid with concentration of 2-40 mass. % only with all other technological conditions unchanged (t=200-280° C. and P=5-15 MPa), refinement quality will be very low and the purity of produced nanodiamond will not exceed 85%.

Using concentration of nitric acid 2 mass. % one should maintain temperature 280° C., pressure 12-15 MPa due to compressed air (proper pressure of 2% nitric acid is 6.5 MPa). Conditioning time—one hour.

The purity of produced nanodiamond—98.7%.

For 40% mass nitric acid it is enough to maintain temperature 200° C. and pressure 5 MPa due to compressed air (proper pressure of 40% nitric acid is 2.9 MPa). Conditioning time is 40 min. The purity of produced nanodiamond 99.2%.

Compressed air secures surplus pressure and ultrabalanced oxygen content, and also high speed of nitric acid regeneration in the system. The value of surplus pressure is 2-9 MPa, created by compressed air, secures both physical conditions (liquid-phase of the system) and compacted material balance between gauzy and compensated components of the system. System's general pressure interval is 5-15 MPa is experimentally determined field of process behavior. Compressed air input into oxygen oxidation system creates the best conditions for oxidation process. Non-diamond carbon oxidation products—$CO_2$, $NO_2$, NO—evolve into gauzy phase. The processes of nitric acid regeneration behave in the following scheme at simultaneous surplus of compressed air in solution and gauzy phase;

$2\ NO + O_2 \leftrightarrows 2\ NO_2 \leftrightarrows N_2O_4$ $4\ NO + 3\ O_2 + 2\ H_2O \leftrightarrows 4\ HNO_3$ $4\ NO_2 + O_2 + 2\ H_2O \leftrightarrows 4\ HNO_3$ Newly created nitric acid comes into reaction with non-diamond carbon. The oxidation system in question can also oxidate main non-carbon impurities in CC—iron, copper, their oxides and some carbide. The given invention can be illustrated by examples of nanodiamond production method realization according to invention, including method of condensed carbon production and its following chemical treatment and production of nanodiamond with improved qualities. Mixed carbon-containing explosives are usually used for CC synthesis, e.g. mix of trinitrotoluene and hexogen or octogen with trinitrotoluene content from 30 to 70%. It is also possible to use trinitrotriaminbenzol mixed with trinitrotoluene, hexogen or octogen. The following was chosen for tests of carbon containing explosives:

charges from mix of trinitrotoluene and hexogen, formed by pressing underpressure of 1500 kg/sm$^2$ with ratio 50/50 (examples 1-18) and melting with ratio 65/35 (examples 19,20);

charges from mix of trinitrotoluene and octogen, formed by pressing underpressure of 1500 kg/sm$^2$ with ratio 60/40 (example 21);

charges from mix of trinitrotriaminbenzol and octogen, formed by pressing under pressure of 1500 kg/sm$^2$ with ratio 50/50 (example 22).

Traditional charge form was chosen—solid cylinder, and cylindrical cartridge diameter—48.5 mm. charge length—167.1 mm.

Charge blasting was realized using electrodetonator, located from the butt end inside the charge. The charge of carbon-containing explosive was put into condensed phase cover—solution of deoxidizer in water in liquid aggregate condition (examples 1-16,18,19,21,22) or in ice condition (example 20), or in cover produced as charge armor from pressed solid deoxidizer (example 17). The cover mass is from 4.0 to 6.0 kg. The covers, in liquid aggregate conditions, were cylindrical polyethylene bags, filled with condensed phase of deoxidizer solution and charge, hanged inside the bag. In case of solid aggregate condition of the cover with use of adamantan as deoxidizer, the cover looked like outer armor over entire surface.

The following was used as deoxidizers: dimethylhydrazine (examples 1-5, 19), urotropine (examples 6-10, 20-22), ammonia (examples 11-13), carbamide (examples 14-16), adamantan (example 17), acentonitrile (example 18) with different, in range of (0.01-10.0):1.0, correlation of mass of used deoxidizer and mass of used explosive correspondingly.

The tests were carried out the following way: covered charge was placed into explosive chamber through upper hatch. The explosive chamber is made of stainless steel, volume of 1 m$^3$, filled with gauzy products of previous blasting. The chamber was closed then and charge blasted. In three minutes after blast the unloading of received water suspension was realized through the lower valve into receiving capacity. Water suspension then was passed through 200 mcm sell sieve and dried. Dried product was crushed and sifted through 80 mcm sell sieve and afterwards the samples of the received product were prepared for further research of their elemental composition according to invention method.

Received product was put into titanic autoclave with 56% nitric acid with estimation of 1 part of received product for 20 parts of acid. Autoclave was heated up to 513K and kept at this temperature for 30 minutes. Then autoclave is cooled, gases were bled, product suspension in work of weak nitric acid was retrieved. Nanodiamonds were washed in distilled water till pH 6-7 and air dried at temperature of 423K for 5 hours.

Samples of the received product were prepared for further research of their elemental composition according to invention method. Researches have determined that diamond-carbon material contains from 8 to 14 mass % of volatile impurity (mainly water, nitrogen oxides and hydrogen oxides). Removal of such impurities, hardly tied by adsorptive forces in micropore, by ordinary air heating at temperatures 120-125° C. is impossible.

Heating temperature increase to higher temperatures is dangerous due to decomposition and flammability of particles of non diamond carbon. To completely remove volatile impurities one should use vacuum with residual pressure 0.01-10.0. The temperature should be maintained in the range of 120-140° C.

Temperature 120° C. is sufficient in vacuum 0.01 Pa, and 140° C. in 10.0 Pa vacuum. It is unreasonable to maintain pressure less then 0.01 Pa due to economical reasons, and higher then 10.0 Pa—due to possible not complete removal of volatile impurities. Increasing temperature beyond 140° C. may cause decomposition of part of unstable non-diamond carbon. The heating time of 3-5 hours guarantees complete removal of volatile impurities. Three hours is enough at 0.01 Pa and 120° C., whereas five hours needed at 10.0 Pa and 140° C.

The standard methodology from organic chemistry is usually used to-determine elemental composition of nanodiamond: heating temperature in oxygen flow is 850-900 C during 5 s. However nanodiamond differs a lot by its resistance towards oxidation from any organic compounds. Thus conditions stated above are not enough for complete oxidation of the elements forming nanodiamond. The temperature providing full oxidation (burn) of nanodiamond is 1050-1200° C., and heating time to be 40-50 seconds. These conditions can be achieved using device No 185 of "Hewlett Packard" (USA).

Samples of received products were sustained at 120-140° C. temperature in vacuum 0.01-10.0 Pa for 3-5 hours and undergo treatment by the oxygen flow under the temperature of 1050-1200° C. with speed providing its burning for 40-50 sec.

Samples of synthesis products, prepared by method described above undergo the following tests:

Research using small-angle dispersion method for determination of quantitative distribution of particles of material over its size;

Research using polarographic titration for determination of existence and composition of surface, oxygen-containing, amine and amide functional groups. The amine, amide, hydroxyl, carboxyl groups are identified by value of corresponding reduction potentials and IR-spectroscopy data;

Research using gas-chromatographic analysis for existence of surface throwing groups, identified by composition of emitted gas at heating, at temperature 663-673K during 3 hours, per quantity of emitted methane. The achieved products were heated at 473K in vacuum (0.1 Pa) until achieving the product of constant weight (during 24 hours) before gas-chromatographic analysis. During the heating process previously absorbed by received product surface volatile products, including gases, were eliminated, and emitted at gas-chromatographic analysis gases $CH_4$, $H_2$, $CO_2$, CO, $O_2$, $N_2$ and $NH_3$ were gases forming at destruction of chemically connected with CC surface groups;

Research using x-ray photoelectron spectroscopy (XPES) to analyze the distribution of carbon forms in achieved product;

Research using small-angle dispersion method (Svergoon D. I., Feigin L. A. x-ray and neutron small-angle dispersion, Moscow, izd <<Nauka>>, 1986, 280 p);

Research using determination of specific surface using powder means of low-temperature sorption nitrogen method (further BET) (Gerasimov Y. M. and others. Physical Chemistry. T. I, edition 2., Moscow, izd. <<Chemistry>>, 1969, p. 592).

Research results are shown in Table.

TABLE

Production of nanodiamond according to invention by the means of invention

| Acquisition method components | Item | Parameters | Example No. 1 | Example No. 2 | Example No. 3 |
|---|---|---|---|---|---|
| A. Explosive | 1 | Composition | Trinitrotoluol/hexogene, 50/50, pressed | Trinitrotoluol/hexogene, 50/50, pressed | Trinitrotoluol/hexogene, 50/50, pressed |
| | 2 | Massa, kg | 0.5 | 0.5 | 0.5 |
| | 3 | Density, g/cm$^3$ | 1.62 | 1.62 | 1.62 |
| B. Shell | 4 | Deoxidant | dimethylhydrazine | dimethylhydrazine | dimethylhydrazine |
| | 5 | Weight ratio of the deoxidant to the explosive | 0.32:1.00 | 0.01:1.00 | 0.16:1.0 |
| | 6 | Solvent | water | water | water |
| | 7 | Shell aggregate state | liquid | liquid | liquid |
| | 8 | Massa, kg | 4.0 | 4.0 | 9.5 |
| C. Derived product | 9 | Nanodiamond output, % of the explosives | 9.1 | 7.0 | |
| | 10 | Element composition, mass %: | | | |
| | | [C] | 96.1 | 90.2 | 93.9 |
| | | [H] | 1.0 | 5.0 | 1.6 |
| | | [N] | 2.2 | 1.5 | 2.5 |
| | | [O] | 0.4 | 3.2 | 1.2 |
| | | Nonflammable impurities | 0.3 | 0.1 | 0.8 |
| | 11 | Nanodiamond phase composition, mass %: | | | |
| | | cubic diamond, | 91 | 85 | 88 |
| | | X-ray amorphous carbon phase | 9 | 15 | 12 |
| | 12 | Nanodiamond content in CC | 60.0 | 58.0 | 68.0 |

TABLE-continued

Production of nanodiamond according to invention by the means of invention

| Acquisition method components | Item | Parameters | Example No. 4 | Example No. 5 | Example No. 6 |
|---|---|---|---|---|---|
| A. Explosive | 1 | Composition | Trinitrotoluol/hexogene, 50/50, pressed | Trinitrotoluol/hexogene, 50/50, pressed | Trinitrotoluol/hexogene, 50/50, pressed |
| | 2 | Massa, kg | 0.5 | 0.5 | 0.5 |
| | 3 | Density, g/cm$^3$ | 1.62 | 1.62 | 1.62 |
| B. Shell | 4 | Deoxidant | dimethylhydrazine | dimethylhydrazine | urotropine |
| | 5 | Weight ratio of the deoxidant to the explosive | 0.64:1.00 | 10.0:1.00 | 0.01:1.00 |
| | 6 | Solvent | water | water | water |
| | 7 | Shell aggregate state | liquid | liquid | liquid |
| | 8 | Massa, kg | 4.0 | 4.0 | 6.0 |
| C. Derived product | 9 | Nanodiamond output, % of the explosives | 10.1 | 8.6 | 8.3 |
| | 10 | Element composition, mass %: | | | |
| | | [C] | 94.2 | 98.0 | 92.3 |
| | | [H] | 2.9 | 1.1 | 2.1 |
| | | [N] | 2.9 | 1.7 | 2.3 |
| | | [O] | 0.1 | 0.1 | 1.8 |
| | | Nonflammable impurities | 0.9 | 0.1 | 1.5 |
| | 11 | Nanodiamond phase composition, mass %: | | | |
| | | cubic diamond, | 91 | 95 | 86 |
| | | X-ray amorphous carbon phase | 9 | 5 | 14 |
| | 12 | Nanodiamond content in CC | 63 | 61 | 66 |

| Acquisition method components | Item | Parameters | Example No. 7 | Example No. 8 | Example No. 9 |
|---|---|---|---|---|---|
| A. Explosive | 1 | Composition | Trinitrotoluol/hexogene, 50/50, pressed | Trinitrotoluol/hexogene, 50/50, pressed | Trinitrotoluol/hexogene, 50/50, pressed |
| | 2 | Massa, kg | 0.5 | 0.5 | 0.5 |
| | 3 | Density, g/cm$^3$ | 1.62 | 1.62 | 1.62 |
| B. Shell | 4 | Deoxidant | urotropine | urotropine | urotropine |
| | 5 | Weight ratio of the deoxidant to the explosive | 0.25:1.0 | 0.50:1.00 | 1.0:1.0 |
| | 6 | Solvent | water | water | water |
| | 7 | Shell aggregate state | liquid | liquid | liquid |
| | 8 | Massa, kg | 6.0 | 6.0 | 6.0 |
| C. Derived product | 9 | Nanodiamond output, % of the explosives | 10.4 | 11.5 | 12.0 |
| | 10 | Element composition, mass %: | | | |
| | | [C] | 94.9 | 95.2 | 96.0 |
| | | [H] | 1.1 | 1.0 | 0.4 |
| | | [N] | 2.5 | 2.2 | 2.6 |
| | | [O] | 1.4 | 1.5 | 0.7 |
| | | Nonflammable impurities | 0.1 | 0.1 | 0.3 |
| | 11 | Nanodiamond phase composition, mass %: | | | |
| | | cubic diamond, | 90 | 92 | 91 |
| | | X-ray amorphous carbon phase | 10 | 8 | 9 |
| | 12 | Nanodiamond content in CC | 71 | 74 | 75 |

TABLE-continued

Production of nanodiamond according to invention by the means of invention

| Acquisition method components | Item | Parameters | Example No. 10 | Example No. 11 | Example No. 12 |
|---|---|---|---|---|---|
| A. Explosive | 1 | Composition | Trinitrotoluol/hexogene, 50/50, pressed | Trinitrotoluol/hexogene, 50/50, pressed | Trinitrotoluol/hexogene, 50/50, pressed |
| | 2 | Massa, kg | 0.5 | 0.5 | 0.5 |
| | 3 | Density, g/cm$^3$ | 1.62 | 1.62 | 1.62 |
| B. Shell | 4 | Deoxidant | urotropine | ammonia | ammonia |
| | 5 | Weight ratio of the deoxidant to the explosive | 10.0:1.00 | 0.01:1.0 | 0.50:1.00 |
| | 6 | Solvent | water | water | water |
| | 7 | Shell aggregate state | suspension | liquid | liquid |
| | 8 | Massa, kg | 6.0 | 5.0 | 5.0 |
| C. Derived product | 9 | Nanodiamond output, % of the explosives | 11.2 | 6.0 | 6.8 |
| | 10 | Element composition, mass %: | | | |
| | | [C] | 97.0 | 91.4 | 92.7 |
| | | [H] | 0.7 | 2.9 | 2.4 |
| | | [N] | 2.0 | 2.8 | 2.9 |
| | | [O] | 0.1 | 2.0 | 1.3 |
| | | Nonflammable impurities | 0.7 | 0.9 | 0.7 |
| | 11 | Nanodiamond phase composition, mass %: | | | |
| | | cubic diamond, | 95 | 86 | 89 |
| | | X-ray amorphous carbon phase | 5 | 14 | 11 |
| | 12 | Nanodiamond content in CC | 69 | 52 | 51 |

| Acquisition method components | Item | Parameters | Example No. 13 | Example No. 14 | Example No. 15 |
|---|---|---|---|---|---|
| A. Explosive | 1 | Composition | Trinitrotoluol/hexogene, 50/50, pressed | Trinitrotoluol/hexogene, 50/50, pressed | Trinitrotoluol/hexogene, 50/50, pressed |
| | 2 | Massa, kg | 0.5 | 0.5 | 0.5 |
| | 3 | Density, g/cm$^3$ | 1.62 | 1.62 | 1.62 |
| B. Shell | 4 | Deoxidant | ammonia | carbamide | carbamide |
| | 5 | Weight ratio of the deoxidant to the explosive | 1.0:1.0 | 10.0:1.00 | 0.4:1.0 |
| | 6 | Solvent | water | water | water |
| | 7 | Shell aggregate state | liquid | liquid | liquid |
| | 8 | Massa, kg | 5.0 | 5.0 | 5.0 |
| C. Derived product | 9 | Nanodiamond output, % of the explosives | 6.4 | 7.5 | 9.0 |
| | 10 | Element composition, mass %: | | | |
| | | [C] | 92.1 | 92.8 | 91.6 |
| | | [H] | 2.9 | 1.8 | 1.8 |
| | | [N] | 3.0 | 2.2 | 2.5 |
| | | [O] | 1.2 | 2.1 | 3.0 |
| | | Nonflammable impurities | 0.8 | 1.1 | 1.1 |
| | 11 | Nanodiamond phase composition, mass %: | | | |
| | | cubic diamond, | 91 | 88 | 86 |
| | | X-ray amorphous carbon phase | 9 | 12 | 14 |
| | 12 | Nanodiamond content in CC | 49 | 58 | 61 |

TABLE-continued

Production of nanodiamond according to invention by the means of invention

| Acquisition method components | Item | Parameters | Example No. 16 | Example No. 17 | Example No. 18 |
|---|---|---|---|---|---|
| A. Explosive | 1 | Composition | Trinitrotoluol/hexogene, 50/50, pressed | Trinitrotoluol/hexogene, 50/50, pressed | Trinitrotoluol/hexogene, 50/50, pressed |
| | 2 | Massa, kg | 0.5 | 0.5 | 0.5 |
| | 3 | Density, g/cm$^3$ | 1.62 | 1.62 | 1.62 |
| B. Shell | 4 | Deoxidant | carbamide | adamantane | acetonitrile |
| | 5 | Weight ratio of the deoxidant to the explosive | 10.0:1.00 | 1.4:1.0 | 2.0:1.00 |
| | 6 | Solvent | water | — | water |
| | 7 | Shell aggregate state | liquid | pressed solid | liquid |
| | 8 | Massa, kg | 5.0 | charge inhibitor | 5.0 |
| C. Derived product | 9 | Nanodiamond output, % of the explosives | 5.4 | 12.6 | 8.0 |
| | 10 | Element composition, mass %: | | | |
| | | [C] | 90.8 | 97.2 | 95.3 |
| | | [H] | 1.4 | 0.2 | 1.2 |
| | | [N] | 3.0 | 2.1 | 2.2 |
| | | [O] | 4.5 | 0.2 | 0.9 |
| | | Nonflammable impurities | 0.3 | 0.3 | 0.4 |
| | 11 | Nanodiamond phase composition, mass %: | | | |
| | | cubic diamond, | 85 | 95 | 93 |
| | | X-ray amorphous carbon phase | 15 | 5 | 7 |
| | 12 | Nanodiamond content in CC | 40 | 80 | 56 |

| Acquisition method components | Item | Parameters | Example No. 19 | Example No. 20 | Example No. 21 |
|---|---|---|---|---|---|
| A. Explosive | 1 | Composition | Trinitrotoluol/hexogene, 65/35, melted | Trinitrotoluol/hexogene, 65/35, melted | Trinitrotoluol/octogene, 60/40, pressed |
| | 2 | Massa, kg | 0.51 | ~0.51 | ~0.51 |
| | 3 | Density, g/cm$^3$ | 1.64 | 1.64 | 1.65 |
| B. Shell | 4 | Deoxidant | dimethylhydrazine | urotropine | urotropine |
| | 5 | Weight ratio of the deoxidant to the explosive | 0.64:1.0 | 0.5:1.0 | 0.5:1.0 |
| | 6 | Solvent | water | water | water |
| | 7 | Shell aggregate state | liquid | ice | liquid |
| | 8 | Massa, kg | 4.0 | 6.0 | 6.0 |
| C. Derived product | 9 | Nanodiamond output, % of the explosives | 11.7 | 12.9 | 13.3 |
| | 10 | Element composition, mass %: | | | |
| | | [C] | 94.8 | 95.2 | 95.9 |
| | | [H] | 1.2 | 1.1 | 0.2 |
| | | [N] | 2.9 | 2.0 | 2.1 |
| | | [O] | 0.2 | 1.1 | 0.8 |
| | | Nonflammable impurities | 0.9 | 0.6 | 1.0 |
| | 11 | Nanodiamond phase composition, mass %: | | | |
| | | cubic diamond, | 92 | 94 | 93 |
| | | X-ray amorphous carbon phase | 8 | 6 | 7 |
| | 12 | Nanodiamond content in CC | 69 | 78 | 79 |

TABLE-continued

Production of nanodiamond according to invention by the means of invention

| Acquisition method components | Item | Parameters | Example No. 22 |
|---|---|---|---|
| A. Explosive | 1 | Composition | Triaminotrinitrobenzol/ octogene, 50/50, pressed |
| | 2 | Massa, kg | 0.53 |
| | 3 | Density, g/cm$^3$ | 1.71 |
| B. Shell | 4 | Deoxidant | urotropine |
| | 5 | Weight ratio of the deoxidant to the explosive | 0.5:1.0 |
| | 6 | Solvent | water |
| | 7 | Shell aggregate state | liquid |
| | 8 | Massa, kg | 6.0 |
| C. Derived product | 9 | Nanodiamond output, % of the explosives | 6.8 |
| | 10 | Element composition, mass %: | |
| | | [C] | 92.0 |
| | | [H] | 2.3 |
| | | [N] | 2.6 |
| | | [O] | 2.3 |
| | | Nonflammable impurities | 0.8 |
| | 11 | Nanodiamond phase composition, mass %: | |
| | | cubic diamond, | 86 |
| | | X-ray amorphous carbon phase | 14 |
| | 12 | Nanodiamond content in CC | 52 |

Researches have discovered that nanodiamond, produced by method of invention is powder from light grey to grey color. Based on polarographic, chromatographic and IR-spectroscopic analysis, the structure of surface functional groups was determined: hydroxyl, carboxyl, carbonyl, amide, nitric, and methane groups were discovered in all samples received in the process carried out according to invention.

X-ray pictures of nanodiamond (Cu $K_\alpha$), produced by mentioned method, show wide symmetrical, well described by Lorenzo's counters diffraction maximums at angles of $2\Theta=43.9, 75.3$ and $91.5°$ corresponding to (111)-, (220)- and (311)-reflections from the grid of cubic modification nanodiamond with grid parameter $a_o=3.565\pm0.002$ A.

Average size of produced nanoparticles—4.0-5.0 nm indicates that widening of diffraction maximums is mainly connected to small particles size, not internal tension.

Strong allocated halo is observed in the range $2\Theta=16°-37°$ that typical for diffraction on random amorphous structures, confirming the presence of x-ray amorphous carbon phase. This structures thickness estimation on halo half-width is 2-4 Å, that is 5-18 mass. % from nanodiamond weight. Besides quantity of amorphous phase was determined from decrease in reflection intensity till 220 nanodiamond according to given invention in comparison to sample of pure natural cubic diamond (Yakutia-Sakha, set. Mirnyi, Russian Federation). X-ray amorphous phase estimated quality is from 5 to 18 mass. %. Existence of ~2.5 mass. % nitrogen in amorphous phase is determined as follows.

Nanodiamond hinged, produced by method according to given invention, was heated at 473K for 20 hours in vacuum in 0.1 Pa until constant weight. Then, different parts of this hinge undergo deep extraction by various dissolvents at temperature of 473-573K under pressure during 3 minutes. Dissolvent used: normal structure—heptane, decane; aromatic-benzol, toluol, alicyclic-cyclohexanecarbon; hydronaphthalene-tetralyne and decalyne. The ratio of diamond phase of carbon, which does not change under such conditions, and amorphous phase, which has decreased, after such treatment was changed. Nanodiamond samples weight has lowered for ~5 mass. %. Only nitrogen-bearing heterocyclic aromatic compositions with number of cycles from 1 to 4 and nitrogen content in circles 1-2 have passed into solution of above mentioned dissolvents. No other heteroatom in any form was found in solution. IR-specters have shown in nanodiamond after extraction all the same surface oxygen, hydrogen, nitrogen-containing groupings placed there before extraction. Thus, nitrogen in form of heterocyclic compositions was definitely supplied from middle layer—x-ray amorphous phase of carbon.

Moreover, complicacy of x-ray amorphous phase of carbon structure in nanodiamond demonstrates the fact that when similarly nanodiamonds samples according to invention (mode: 473K, 20 hours, 0.1 Pa) undergo thermal desorption under sift conditions (mode: 573K, 2 hours, 0.001 Pa), desorption products content was diverse: acentonitrile, nitromethane, butanone-1 -on and butanone-2 -on, tetrahydrofuran, ethilazitate, benzol and homolog, alkyl benzene ($C_9$ and $C_{10}$), alkanes ($C_7$-$C_{11}$), ethylene ($C_7$-$C_{10}$), terpene ($C_{10}$) and naphthalene ($C_{10}$).

Partial destruction of outer functional groups takes place at 573K. During this process nitromethane, butanone, tetrahydrofuran, ethylatite, presumably, acentonitrile. However main quantity of identified compositions: benzol and homolog, alkanes, alkenes, terpene and naphthalene—possessing special character and structure, may form only at x-ray amorphous carbon phase destruction that is verified by fact of samples mass reduction after thermal desorption ~8 mass. %. Temperature of nanodiamonds oxidations beginning in open air-gasification temperature, measured by derivathograph at heating speed 10 deg/min, is 473K, and small exo-effect is observed till 800 K. All non-diamond x-ray amorphous carbon is being oxidated at this. The sample weight reduction is 5-18 mass. %, corresponding with x-ray carbon quantity in nano-diamond.

After heating over 800K strong exo-effect is observed. This testifies about reaction of air oxygen with diamond nuclei of nano-diamond that is over at 1050K by nanodiamond full oxidation (burning out). Maximum heat discharge (maximum oxidation) takes place at 930-990K.

The research of crystal diamonds of static synthesis (ASM), smashed into particles 2-100 nm in size (with average diameter of 20 nm), put into conditions alike, were carried out. Research showed that the temperature of the diamond crystal oxidation process beginning is 785K, but maximum oxidation temperature is 890K. Full oxidation process of ASM is over at 1060K. So, oxidation resistance of classic diamond and nanodiamond, according to given invention, and classic synthetic diamonds is almost the same.

Nanodiamond, produced by method according to closest analogue, has its diamond nuclei oxidated at 703K.

Every particle of nanodiamond of given invention has complicated structural formation, including the following elements as compulsory components:

carbon atoms nuclei $sp^3$-hybridized, connected into cubic crystal structure, typical for diamonds; nuclei covers 82-95% of carbon atoms and possesses due to x-ray-graphy size of 40-50 Å; nuclei has ~2.5 mas. % nitrogen, mainly in form of substitution atoms; transition carbon cover around the nuclei, consisting from x-ray amorphous structures of carbon with width of 2-4 Å, which can contain 5-18% of carbon atoms of a particle. The cover, consisting of carbon in $sp^2$-hybridization, is not uniform. Internal layer of this cover, directly adjoining nuclei, form continuous onion-like carbon layers, fragmented, graphite-like layers (aromatic clusters) located above them.

This amorphous carbon cover possesses porous structure, various defects, includes small quantity of heteroatoms (first of all—2.5 mass. % nitrogen), enter the cover structure in process of detonation synthesis;

surface layers, containing other heteroatoms except carbon atoms, forming specter of different functional groups (hydroxyl-, carbonyl-, carboxyl, nitrile and methal groups). Overall quantity of heteroatoms in particle—nitrogen, hydrogen and oxygen—is from 2.0 to 9.8 mass, %.

Thus, it was determined that nanodiamonds are not pure carbon material. Carbon exists in the product simultaneously in different modifications and only one of them corresponds to diamond structure. Outer cover of nanodiamond particle determines its relation with the environment. That is it forms the phase interface and takes part in interacting with it. Presence on the surface of highly-polar and reaction-capable groupings, concentrated in small volume, determines sufficient influence activity of nanodiamond particles onto environment.

Nanodiamond, produced by present invention, is unique material due to its transitional nature from inorganic product to organic and this determines its special position among ultradispersed materials.

Industrial use.

Nanodiamond, produced by method according to invention, allows its use as nanosize component of high-efficacy composite materials as additives, improving exploitation characteristics of construction-endurance, durability, resource—more than from use of nanodiamonds, known from above described previous technical level. Nanodiamonds, according to invention, can be produced by method according to invention, which can be realized with help of existing technological equipment and known explosives.

The invention claimed is:

1. Nanodiamond comprising carbon, hydrogen, nitrogen and oxygen wherein the carbon is diamond cubic modification and x-ray amorphous phase carbon with a ratio (82-95):(18-5) mass % of carbon mass, respectively, and comprising mass %:
   Carbon 91.0-98.0
   Hydrogen 0.1-5.0
   Nitrogen 1.5-3.0, and
   Oxygen 0.1-4.5
   and wherein the nanodiamond has been prepared by detonating carbon-containing explosive with negative oxygen balance in closed volume and in gaseous environment being inert towards carbon,
   surrounding charge of explosive with by condensed phase containing required amount of deoxidizer a mass ratio of the deoxidizer in the condensed phase to a mass of used carbon-containing explosive not less than 0.01:1 respectively,
   chemically refining by treating formed products with 2-40% aqueous nitric acid along with compressed air oxygen at 200-280° C. and pressure 5-15 MPa.

2. Nanodiamond production method comprising:
   detonating carbon-containing explosive with negative oxygen balance in closed volume and in gaseous environment being inert towards carbon,
   surrounding charge of explosive with by condensed phase containing required amount of deoxidizer a mass ratio of the deoxidizer in the condensed phase to a mass of used carbon-containing explosive not less than 0.01:1 respectively,
   chemically refining by treating formed products with 2-40% aqueous nitric acid along with compressed air oxygen at 200-280° C. and pressure 5-15 MPa, and
   producing nanodiamond containing mass %:
   Carbon 91.0-98.0
   Hydrogen 0.1-5.0
   Nitrogen 1.5-3.0
   Oxygen 0.1-4.5, and
   containing carbon of diamond cubic modification and carbon in x-ray amorphous phase with ratio of (82-95):(18-5) mass %, respectively.

3. The method of claim 2, wherein inorganic or organic substance is used as deoxidizer.

4. The method of claim 3, wherein the deoxidizer does not contain elements selected from the group consisting of oxygen, halogen, and combinations thereof.

* * * * *